(12) United States Patent
Blindt

(10) Patent No.: US 10,538,283 B2
(45) Date of Patent: Jan. 21, 2020

(54) DRIVE SPROCKET ASSEMBLY FOR A TRACKED MACHINE

(71) Applicant: Caterpillar Inc., Peoria, IL (US)

(72) Inventor: Todd Michael Blindt, Canton, IL (US)

(73) Assignee: Caterpillar Inc., Peoria, IL (US)

( * ) Notice: Subject to any disclaimer, the term of this patent is extended or adjusted under 35 U.S.C. 154(b) by 255 days.

(21) Appl. No.: 15/656,306

(22) Filed: Jul. 21, 2017

(65) Prior Publication Data
US 2019/0023335 A1  Jan. 24, 2019

(51) Int. Cl.
| | |
|---|---|
| *B62D 55/125* | (2006.01) |
| *B62D 55/06* | (2006.01) |
| *F16H 55/12* | (2006.01) |
| *F16H 55/30* | (2006.01) |
| *E02F 3/30* | (2006.01) |

(52) U.S. Cl.
CPC .......... *B62D 55/125* (2013.01); *B62D 55/06* (2013.01); *F16H 55/12* (2013.01); *F16H 55/30* (2013.01); *E02F 3/308* (2013.01)

(58) Field of Classification Search
CPC ...... B62D 55/125; B62D 55/13; B62D 55/06; F16H 55/30; F16H 55/12; E02F 3/308
USPC ......................................................... 305/199
See application file for complete search history.

(56) References Cited

U.S. PATENT DOCUMENTS

| | | | | |
|---|---|---|---|---|
| 2,859,635 | A * | 11/1958 | Lee ......................... | F16H 55/12 74/439 |
| 2001/0045773 | A1* | 11/2001 | Rutz ...................... | B62D 55/08 305/199 |
| 2013/0038119 | A1 | 2/2013 | Griffith et al. | |
| 2016/0052570 | A1* | 2/2016 | Ellmann ................ | B62D 55/12 305/142 |
| 2016/0159418 | A1* | 6/2016 | Zimmer ................ | B62D 55/14 180/9.62 |
| 2016/0325793 | A1* | 11/2016 | Zuidberg .............. | B62D 55/04 |

FOREIGN PATENT DOCUMENTS

| | | |
|---|---|---|
| DE | 2438141 | 2/1976 |
| GB | 862881 | 3/1961 |

OTHER PUBLICATIONS

Boundary Equipment Co. Ltd., Boundary 7495 Drive Tumbler with Replaceable Lugs, Salesgram Flyer, Jun. 2016, Edmonton, Alberta, Canada.

* cited by examiner

*Primary Examiner* — S. Joseph Morano
*Assistant Examiner* — Jean W Charleston

(57) ABSTRACT

A drive sprocket assembly is provided. The drive sprocket assembly includes at least one first segment and at least one second segment. Each of the at least one first segment and the at least one second segment is adapted to be removably affixed to a hub of the drive sprocket assembly. Each of the at least one first segment and the at least one second segment includes a top surface and an inner surface extending away from the top surface. The inner surface includes a stepped configuration. The inner surface is adapted to at least partially abut a raised portion of the hub and an outer surface of the hub. The drive sprocket assembly also includes a tooth segment provided on the top surface of each of the at least one first segment and the at least one second segment respectively.

19 Claims, 4 Drawing Sheets

DRIVE SPROCKET ASSEMBLY FOR A TRACKED MACHINE

TECHNICAL FIELD

The present disclosure relates to a drive sprocket assembly for a tracked machine. More particularly, the present disclosure relates to the drive sprocket assembly for a drive assembly of a tracked machine.

BACKGROUND

Generally, a tracked machine, such as an electric rope shovel, includes a drive assembly for transferring motive power from one or more of an engine, an electric motor, and/or a transmission system to a ground engaging track of the machine. In some embodiments, the drive assembly includes a sprocket mounted on a drive shaft thereof. In other embodiments, the sprocket may be mounted on a final drive planetary assembly. The sprocket provides interconnection with the track and transfer of motive power therebetween.

The sprocket may experience accelerated wear due to friction mainly due to repeated contact with the track, contact with debris deposited around the sprocket, operation in harsh environment with the ground, and so on. As a result, the sprocket may require frequent replacement in order to provide optimal contact between the sprocket and the track. In a situation when the sprocket may be mounted on the drive shaft, in order to provide access to the sprocket for repair/replacement, the drive shaft may have to be disassembled from the drive assembly in order to provide access to the sprocket for repair/replacement thereof.

The drive shaft may be mounted on a set of bearings within the drive assembly. In some situations, the drive shaft may be affixed to the bearings via an interference fit therebetween. As a result, in such a situation, the drive assembly may have to completely dismantled in order to disassembly the dive shaft along with the bearings for providing access to the sprocket. This may lead to increased repair time, machine downtime, labor cost, physical effort, and so on.

In some situations, the drive shaft may be mounted on the bearings with a loose fit therebetween. This may provide limited dismantling of the drive assembly in order to disassemble the drive shaft and the sprocket from the drive assembly without the bearings. However, the loose fit may result in increased shaft movement, increased seal movement, increased noise and/or increased friction between contacting surfaces of the drive shaft and bearings, such as an outer surface of the drive shaft and an inner surface of the bearings, and so on. As a result, the drive shaft, the bearings, the seals, drive couplings, and so on may experience accelerated wear leading to frequent replacement, increased replacement costs, and so on.

Also, in some situations, one or more teeth or sections of the sprocket may be worn out or damaged prior to remaining teeth or sections of the sprocket which may have some usable life remaining before complete wear of the sprocket. In such a situation, the complete sprocket may have to be replaced, in turn, leading to reduce component usability, increased replacement cost, and so on. Hence, there is a need for an improved sprocket for the drive assembly.

U.S. Published Application Number 2013/0038119 describes a sprocket assembly for a vehicle having a chassis and at least one endless track for engaging a ground surface. The track is movably coupled to the chassis and driven by a sprocket assembly. The sprocket assembly includes at least one sprocket segment, a hub rotationally coupled to the chassis, and a fastening system configured to displace some material portion of the sprocket segment when the sprocket segment is attached to the hub.

SUMMARY OF THE DISCLOSURE

In an aspect of the present disclosure, a drive sprocket assembly is provided. The drive sprocket assembly includes a hub. The hub includes an inner surface and an outer surface. The hub also includes a raised portion provided centrally along the outer surface. The raised portion includes a top surface and a first side surface extending between the top surface and the outer surface. The raised portion also includes a second side surface disposed opposite the first side surface. The second side surface extends between the top surface and the outer surface. The drive sprocket assembly also includes at least one first segment and at least one second segment. Each of the at least one first segment and the at least one second segment is adapted to be removably affixed to the hub. Each of the at least one first segment and the at least one second segment includes a top surface and an inner surface. The inner surface includes a first portion extending away from the top surface. The inner surface includes a second portion extending away from the first portion. The second portion is adapted to at least partially abut the top surface of the raised portion. The inner surface also includes a third portion extending away from the second portion. The third portion is adapted to at least partially abut the first side surface and the second side surface of the raised portion respectively. The inner surface further includes a fourth portion extending away from the third portion. The fourth portion is adapted to at least partially abut the outer surface. The drive sprocket assembly further includes a tooth segment provided on the top surface of each of the at least one first segment and the at least one second segment respectively.

In another aspect of the present disclosure, a drive sprocket assembly is provided. The drive sprocket assembly includes at least one first segment and at least one second segment. Each of the at least one first segment and the at least one second segment is adapted to be removably affixed to a hub of the drive sprocket assembly. Each of the at least one first segment and the at least one second segment includes a top surface and an inner surface extending away from the top surface. The inner surface includes a stepped configuration. The inner surface is adapted to at least partially abut a raised portion of the hub and an outer surface of the hub. The drive sprocket assembly also includes a tooth segment provided on the top surface of each of the at least one first segment and the at least one second segment respectively.

In yet another aspect of the present disclosure, a drive assembly for an electric rope shovel is provided. The drive assembly includes a housing and a drive shaft rotatably mounted within the housing. The drive assembly also includes a drive sprocket assembly mounted on the drive shaft. The drive sprocket assembly includes a hub. The hub includes an inner surface adapted to receive the drive shaft therein and an outer surface. The hub also includes a raised portion provided centrally along the outer surface. The raised portion includes a top surface. The hub also includes a first side surface extending between the top surface and the outer surface. The hub further includes a second side surface disposed opposite the first side surface. The second side surface extends between the top surface and the outer surface. The drive sprocket assembly also includes at least one first segment and at least one second segment. Each of the at least one first segment and the at least one second segment is adapted to be removably affixed to the hub. Each of the at least one first segment and the at least one second segment includes a top surface and an inner surface. The inner surface includes a first portion extending away from the top surface. The inner surface includes a second portion extending away from the first portion. The second portion is adapted to at least partially abut the top surface of the raised portion. The inner surface also includes a third portion extending away from the second portion. The third portion is adapted to at least partially abut the first side surface and the second side surface of the raised portion respectively. The inner surface further includes a fourth portion extending away from the third portion. The fourth portion is adapted to at least partially abut the outer surface. The drive sprocket assembly further includes a tooth segment provided on the top surface of each of the at least one first segment and the at least one second segment respectively. Each of the at least one first segment and the at least one second segment is adapted to receive at least a portion of a track of the electric rope shovel thereon.

Other features and aspects of this disclosure will be apparent from the following description and the accompanying drawings.

DETAILED DESCRIPTION

Figure 1:
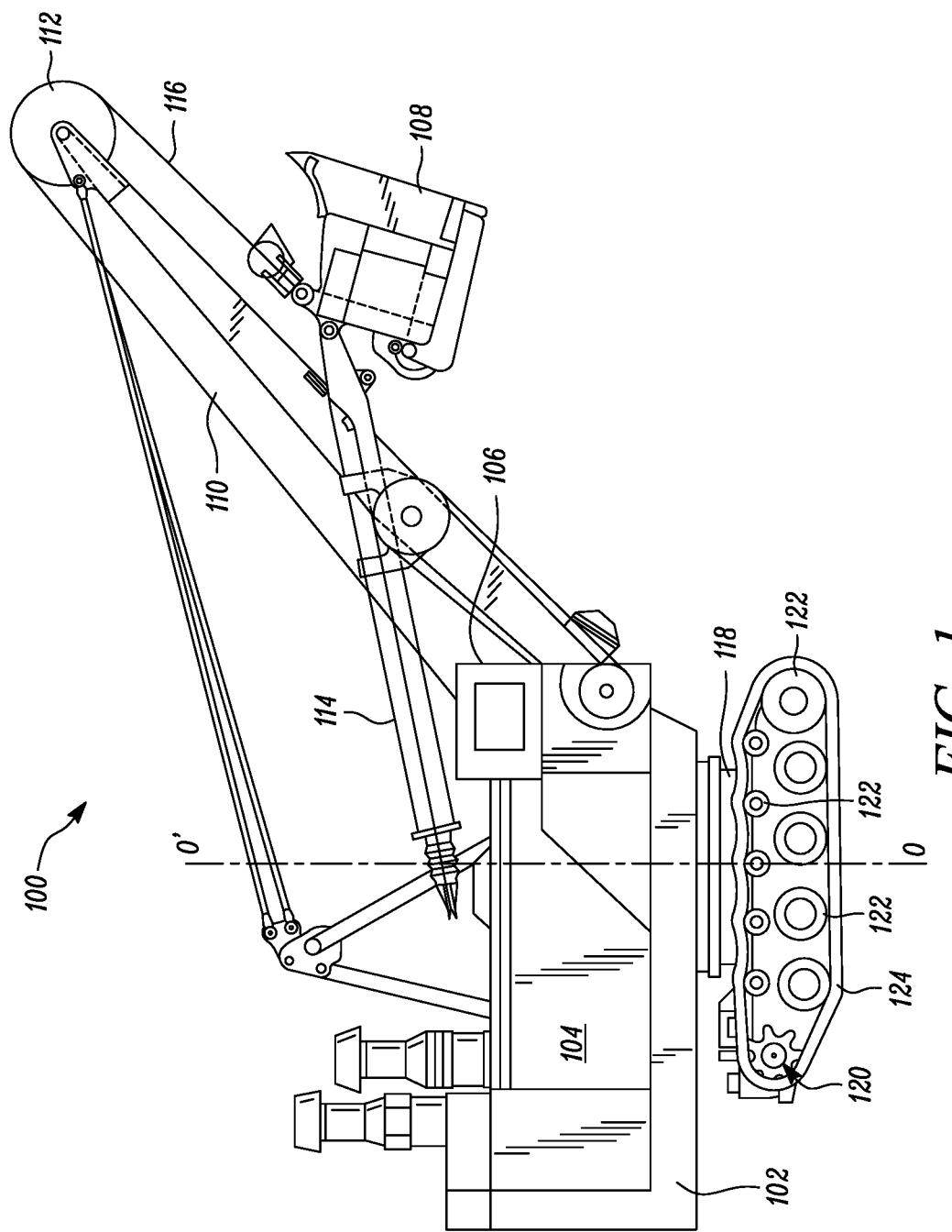
FIG. 1 is a side view of an exemplary machine, according to one embodiment of the present disclosure.

Wherever possible, the same reference numbers will be used throughout the drawings to refer to the same or the like parts. Referring to FIG. 1, an exemplary machine 100 is illustrated. More specifically, the machine 100 is an electric rope shovel. In other embodiments, the machine 100 may be any other tracked machine, such as a track type tractor, a hydraulic excavator, and so on. The machine 100 may be associated with any industry, including, but not limited to, construction, mining, agriculture, material handling, and transportation.

The machine 100 includes a frame 102. The frame 102 supports one or more components of the machine 100. The machine 100 includes an enclosure 104 provided on the frame 102. In one embodiment, the enclosure 104 may house a power source (not shown) therein mounted on the frame 102. The power source may be any power source known in the art, such as an internal combustion engine, batteries, motor, and so on, and/or a combination thereof. The power source may be adapted to provide power to the machine 100 for mobility and operational requirements. In another embodiment, the power source may be external to the machine 100. In such a situation, the power source may be an electric power source connected to the machine 100 via an umbilical cord (not shown). As such, the enclosure 104 may house various other control systems associated with the machine 100, such as an electrical control system, a drive control system, a hydraulic system, and so on.

The machine 100 includes an operator cabin 106 mounted on the frame 102. The operator cabin 106 may house various controls (not shown) of the machine 100. The controls may include a steering wheel, an operator console, joysticks, levers, pedals, switches, knobs, buttons, audio visual devices, and so on. The controls are adapted to enable an operator (not shown) to control the machine 100 on the ground.

The machine 100 includes an implement, such as a dipper 108. The dipper 108 is adapted to perform tasks, such as earth moving, material handling, and so on, based on application requirements. The machine 100 includes a boom 110 pivotally coupled to the frame 102. The machine 100 includes a pulley 112 rotatably coupled to the boom 110. The machine 100 includes a handle 114 pivotally coupled to the boom 110 and the dipper 108. The machine 100 also includes one or more ropes 116 operably coupled to the frame 102 and the dipper 108 via the pulley 112. Each of the boom 110, the handle 114, the pulley 112, and the ropes 116 is adapted to control the dipper 108 in space around the machine 100 during a work cycle thereof.

The machine 100 also includes an undercarriage 118 rotatably mounted to the frame 102. The undercarriage 118 is adapted to support the frame 102 on the ground. The undercarriage 118 is also adapted to rotate about a vertical axis O-O' with respect to the frame 102. Accordingly, the undercarriage 118 is adapted to provide maneuverability to the machine 100 on the ground. The undercarriage 118 includes a drive assembly 120 and a set of rollers 122, such as one or more driven rollers, one or more idlers, and so on. The undercarriage 118 also includes a track 124 mounted on the drive assembly 120 and the set of rollers 122. Each of the drive assembly 120, the set of rollers 122, and the track 124 is adapted to provide mobility to the machine 100 on the ground.

Figure 2:
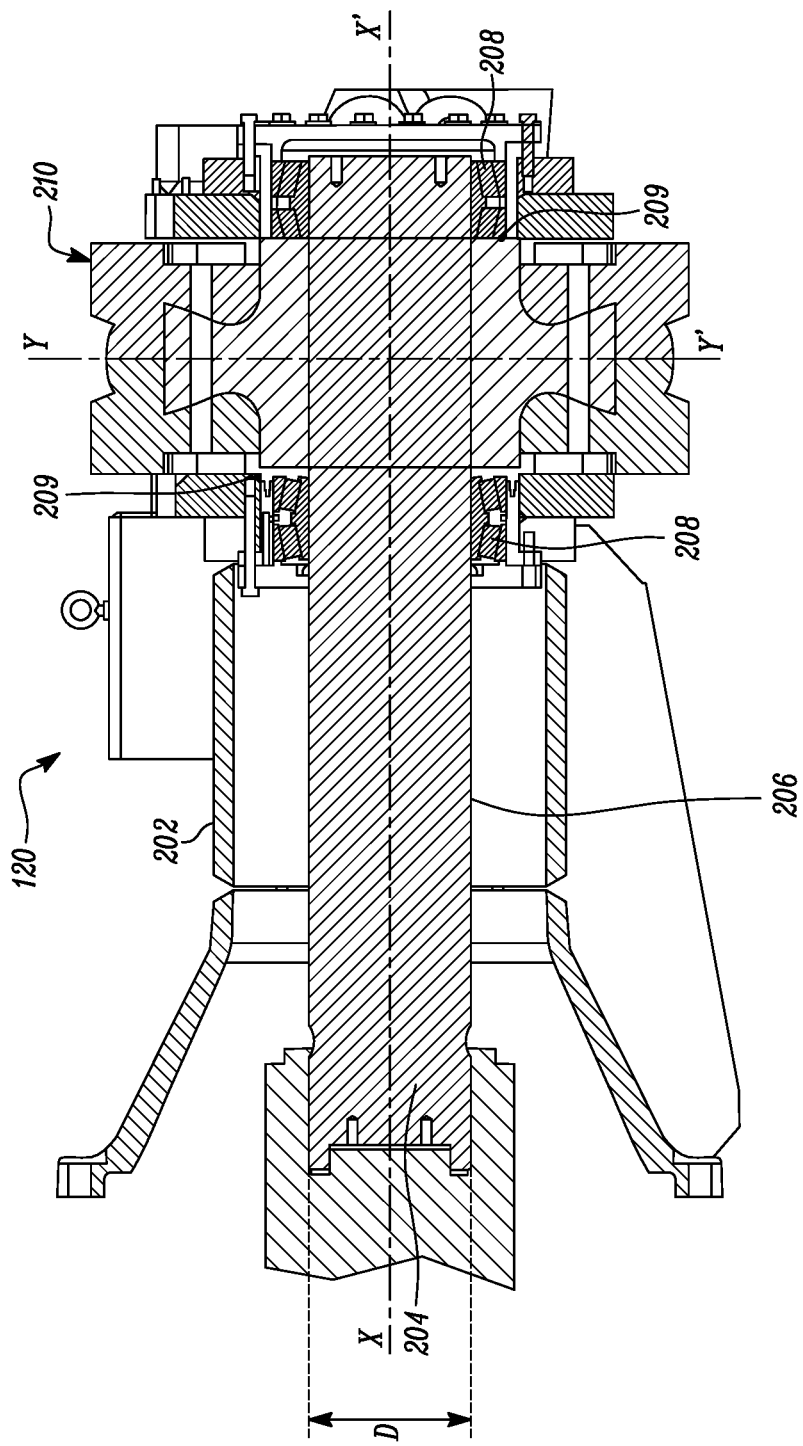
FIG. 2 is a cross sectional view of an exemplary drive assembly of the machine of FIG. 1, according to one embodiment of the present disclosure.

Referring to FIG. 2, a cross-sectional view of the drive assembly 120 is illustrated. The drive assembly 120 includes a housing 202. The housing 202 is adapted to enclose one or more components of the drive assembly 120 therein. The drive assembly 120 also includes a drive shaft 204 rotatably mounted within the housing 202. The drive shaft 204 includes an outer surface 206 defining a diameter "D" thereof. More specifically, the drive shaft 204 is rotatably mounted within the housing 202 using one or more bearings 208, seals 209, and so on supported within the housing 202. The drive shaft 204 may be further operably coupled to the power source through a transmission unit output (not shown). Accordingly, the drive shaft 204 may receive motive power from the power source and is adapted to rotate within the housing 202.

The drive assembly 120 also includes a drive sprocket assembly 210. The drive sprocket assembly 210 will be hereinafter interchangeably referred to as the "assembly 210". The assembly 210 is fixedly mounted on the drive shaft 204. Accordingly, the assembly 210 is adapted to rotate along with the drive shaft 204. Also, the assembly 210 is operably coupled to the track 124 of the machine 100. Accordingly, the assembly 210 is adapted to transfer the motive power form the drive shaft 204 to the track 124. The assembly 210 will be explained in more detail with reference to FIGS. 3 and 4. It should be noted that, in other embodiments, the assembly 210 may be alternatively mounted to a final drive planetary assembly (not shown) associated with the machine 100, based on application requirements.

Figure 3:
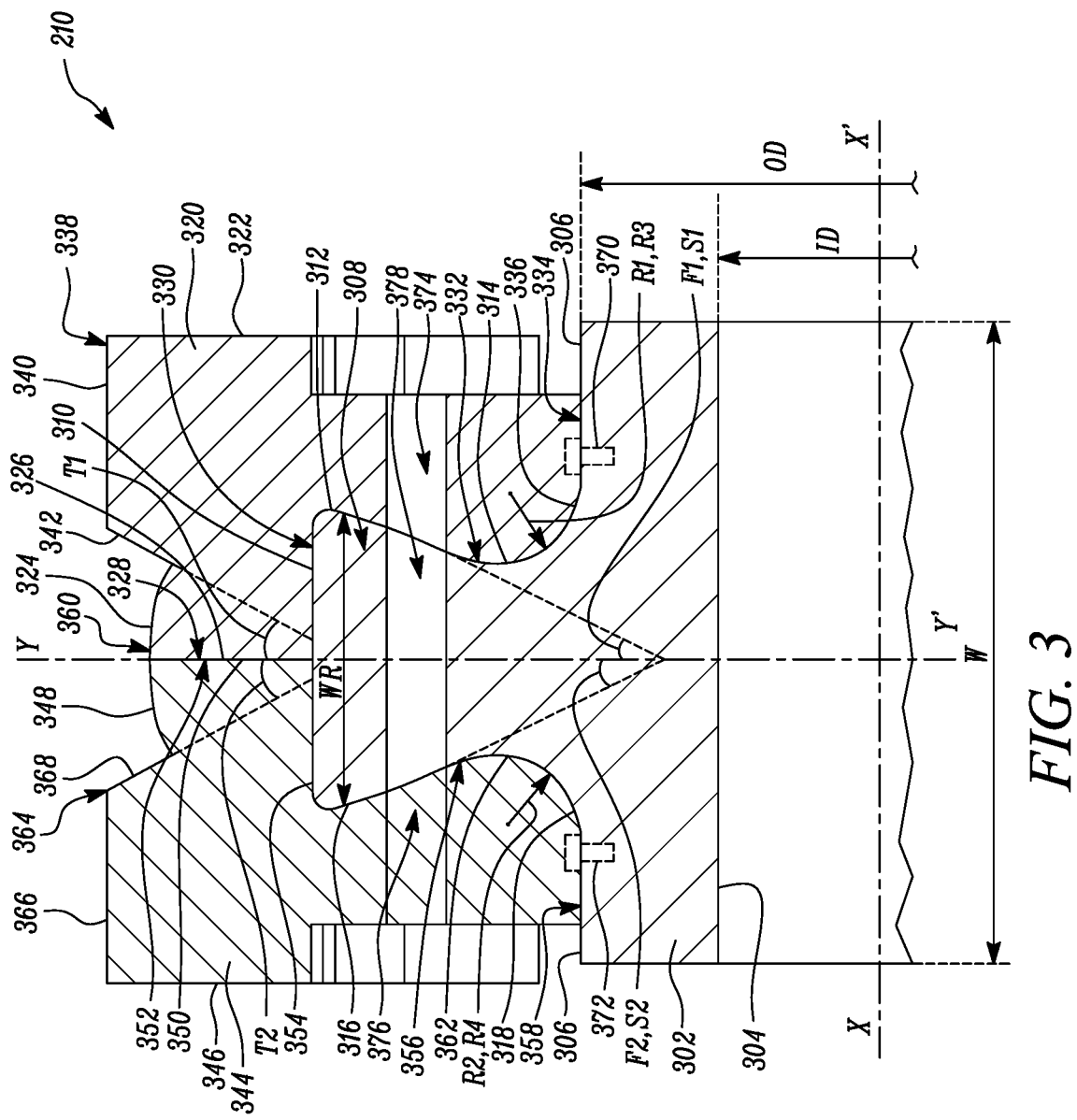
FIG. 3 is a partial cross-sectional view of a drive sprocket assembly of the drive assembly of FIG. 1 along a section A-A' shown in FIG. 4, according to one embodiment of the present disclosure.
Figure 4:
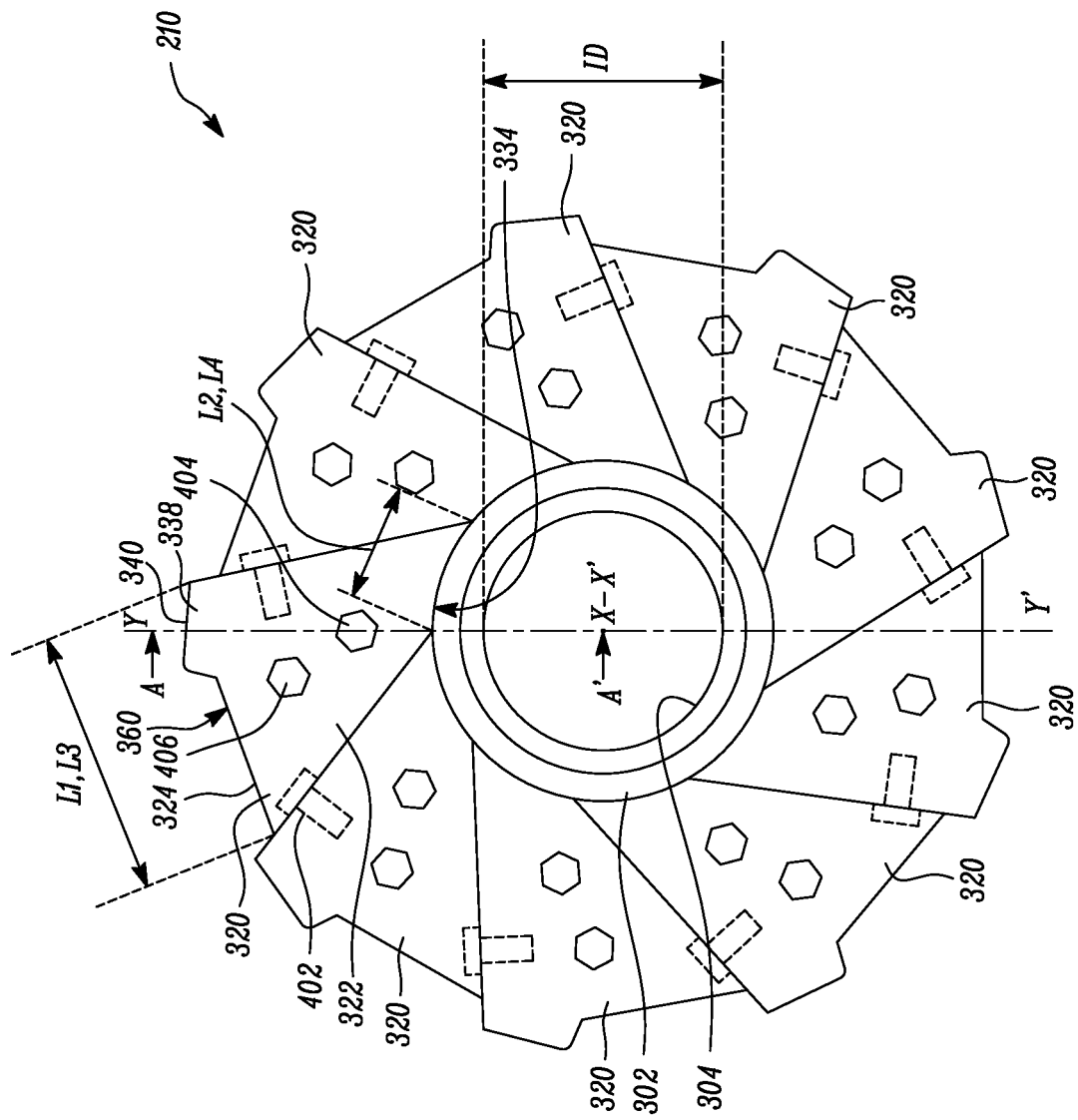
FIG. 4 is a side view of the drive sprocket assembly of FIG. 3, according to one embodiment of the present disclosure.

Referring to FIGS. 3 and 4, the assembly 210 includes a hub 302. The hub 302 includes a substantially cylindrical and hollow configuration. The hub 302 defines a rotational axis X-X', a transverse axis Y-Y', and a width "W" thereof. The hub 302 includes an inner surface 304 defining an inner diameter "ID" of the hub 302. The inner surface 304 is adapted to receive the drive shaft 204 of the drive assembly 120. In the illustrated embodiment, the inner diameter "ID" is approximately equal to the diameter "D" of the drive shaft 204. Accordingly, the hub 302 is fixedly mounted on the drive shaft 204 via an interference fit between the inner surface 304 of the hub 302 and the outer surface 206 of drive shaft 204.

In other embodiments, the hub 302 may be fixedly mounted on the drive shaft 204 using one or more fasteners (not shown) provided between the hub 302 and the drive shaft 204, such as a key, a screw, a bolt, and/or a combination thereof, and so on. Also, in some embodiments, the inner surface 304 of the hub 302 may include one or more splines (not shown). The splines may be adapted to mate with one or more splines (not shown) provided on the outer surface 206 of the drive shaft 204. The mating of the splines of the hub 302 with respect to the splines of the drive shaft 204 may limit relative movement between the hub 302 and the drive shaft 204.

The hub 302 also includes an outer surface 306. The outer surface 306 defines an outer diameter "OD" of the hub 302. The hub 302 further includes a raised portion 308. The raised portion 308 is provided centrally on the outer surface 306 along the transverse axis Y-Y' of the hub 302. Also, the raised portion 308 extends endlessly along the outer surface 306 of the hub 302. The raised portion 308 defines a width "WR" thereof. The width "WR" is substantially lesser with respect to the width "W" of the hub 302. In the illustrated embodiment, the raised portion 308 includes a substantially wedge-shaped configuration. In other embodiments, the raised portion 308 may include any other configuration, such as rectangular, and so on, based on application requirements.

The raised portion 308 includes a top surface 310. In the illustrated embodiment, the top surface 310 includes a substantially flat configuration. In other embodiments, the top surface 310 may include any other configuration, such as curved configuration, an inclined configuration, and so on, based on application requirements. In the illustrated embodiment, the top surface 310 is substantially perpendicular to the transverse axis Y-Y'. In other embodiments, the top surface 310 may be inclined at any angle with respect to the transverse axis Y-Y', based on application requirements.

The raised portion 308 also includes a first side surface 312. The first side surface 312 extends from the top surface 310 and connects the outer surface 306 of the hub 302. In the illustrated embodiment, the top surface 310 connects the first side surface 312 in a rounded configuration in order to limit stress concentration therearound. In other embodiments, the top surface 310 may connect the first side surface 312 in any other configuration, such as an edged configuration, a chamfered configuration, an inclined configuration, and so on, based on application requirements. In the illustrated embodiment, an intersection 314 of the first side surface 312 and the outer surface 306 of the hub 302 includes a curved configuration defining a radius of curvature "R1" thereof. In other embodiments, the intersection 314 of the first side surface 312 and the outer surface 306 of the hub 302 may have any other configuration, such as an edged configuration, a chamfered configuration, an inclined configuration, and so on, based on application requirements. Also, in the illustrated embodiment, the first side surface 312 is inclined at an angle "F1" with respect to the transverse axis Y-Y'. In other embodiments, the first side surface 312 may be parallel with respect to the transverse axis Y-Y', based on application requirements.

The raised portion 308 further includes a second side surface 316. The second side surface 316 is disposed opposite the first side surface 312. The second side surface 316 extends from the top surface 310 and connects the outer surface 306 of the hub 302. In the illustrated embodiment, the top surface 310 connects the second side surface 316 in a rounded configuration in order to limit stress concentration therearound. In other embodiments, the top surface 310 may connect the second side surface 316 in any other configuration, such as an edged configuration, a chamfered configuration, an inclined configuration, and so on, based on application requirements. In the illustrated embodiment, an intersection 318 of the second side surface 316 and the outer surface 306 of the hub 302 includes a curved configuration defining a radius of curvature "R2" thereof. In the illustrated embodiment, the radius of curvature "R2" is equal to the radius of curvature "R1" of the intersection 314. In other embodiments, the radius of curvature "R2" may vary with respect to the radius of curvature "R1" of the intersection 314, based on application requirements.

In other embodiments, the intersection 318 of the second side surface 316 and the outer surface 306 of the hub 302 may have any other configuration, such as an edged configuration, a chamfered configuration, an inclined configuration, and so on, based on application requirements. Also, in the illustrated embodiment, the second side surface 316 is inclined at an angle "F2" with respect to the transverse axis Y-Y'. In the illustrated embodiment, the angle "F2" is equal to the angle "F1" of the first side surface 312. In other embodiments, the angle "F2" may vary with respect to the angle "F1" of the first side surface 312, based on application requirements. In other embodiments, the second side surface 316 may be parallel with respect to the transverse axis Y-Y', based on application requirements.

The assembly 210 also includes a plurality of first segments 320. Each of the plurality of first segments 320 is adapted to be removably affixed to the outer surface 306 of the hub 302. Each of the plurality of first segments 320 is disposed adjacent to one another along the outer surface 306 of the hub 302. Each of the plurality of first segments 320 includes a wedge-shaped configuration. In the illustrated embodiment, the plurality of first segments 320 includes nine segments. In other embodiments, the plurality of first segments 320 may include any number of segments, based on application requirements.

Each of the plurality of first segments 320 includes a first outer surface 322. In the illustrated embodiment, the first outer surface 322 includes a substantially flat and stepped configuration. Also, the first outer surface 322 is disposed parallel with respect to the transverse axis Y-Y'. In other embodiments, the first outer surface 322 may include any other configuration, and may be disposed at any angle with respect to the transverse axis Y-Y', based on application requirements. Each of the plurality of first segments 320 also includes a first top surface 324. The first top surface 324 extends away from the first outer surface 322 and towards the transverse axis Y-Y'. In the illustrated embodiment, the first top surface 324 includes a substantially curved configuration. In other embodiments, the first top surface 324 may include any other configuration, such as a flat configuration. The first top surface 324 defines a length "L1" thereof.

Each of the plurality of first segments 320 further includes a first inner surface 326. The first inner surface 326 extends from the first top surface 324 and connects the first outer surface 322. The first inner surface 326 includes a substantially stepped configuration. More specifically, the first inner surface 326 includes a first portion 328, a second portion 330, a third portion 332, and a fourth portion 334. The first portion 328 extends away from the first top surface 324 along the transverse axis Y-Y'. In the illustrated embodiment, the first portion 328 includes a substantially flat configuration. In other embodiments, the first portion 328 may include any other configuration, such as a curved configuration, a stepped configuration, a grooved configuration, and so on, based on application requirements. Also, the first portion 328 is disposed parallel with respect to the transverse axis Y-Y'. In other embodiments, the first portion 328 may be disposed at any angle with respect to the transverse axis Y-Y', based on application requirements.

The second portion 330 extends away from the first portion 328 and away from the transverse axis Y-Y'. In the illustrated embodiment, the second portion 330 includes a substantially flat configuration. In other embodiments, the second portion 330 may include any other configuration, such as a curved configuration, a stepped configuration, a grooved configuration, and so on, based on application requirements. Also, the second portion 330 is disposed perpendicular with respect to the transverse axis Y-Y'. In other embodiments, the second portion 330 may be disposed at any angle with respect to the transverse axis Y-Y', based on application requirements. In an installed position of the first segment 320 on the hub 302, the second portion 330 is adapted to contact and abut the top surface 310 of the raised portion 308 of the hub 302.

The third portion 332 extends away from the second portion 330 along the transverse axis Y-Y'. In the illustrated embodiment, the third portion 332 includes a partially flat and partially curved configuration. In other embodiments, the third portion 332 may include any other configuration, such as a fully flat configuration, a fully curved configuration, a stepped configuration, a grooved configuration, and so on, based on application requirements. Also, the third portion 332 is disposed at an angle "S1" with respect to the transverse axis Y-Y'. In other embodiments, the third portion 332 may be disposed parallel with respect to the transverse axis Y-Y', based on application requirements. In the installed position of the first segment 320 on the hub 302, the third portion 332 is adapted to contact and abut the first side surface 312 of the raised portion 308 of the hub 302. Accordingly, the angle "S1" is equal to the angle "F1" of the first side surface 312. In the illustrated embodiment, the third portion 332 connects the second portion 330 in a rounded configuration in order to limit stress concentration therearound. In other embodiments, the third portion 332 may connect the second portion 330 in any other configuration, such as an edged configuration, a chamfered configuration, an inclined configuration, and so on, based on application requirements.

The fourth portion 334 extends away from the third portion 332 and away from the transverse axis Y-Y' and connects the first outer surface 322. In the illustrated embodiment, the fourth portion 334 includes a substantially flat configuration. In other embodiments, the fourth portion 334 may include any other configuration, such as a curved configuration, a stepped configuration, a grooved configuration, and so on, based on application requirements. Also, the fourth portion 334 is disposed perpendicular with respect to the transverse axis Y-Y'. In other embodiments, the fourth portion 334 may be disposed at any angle with respect to the transverse axis Y-Y', based on application requirements. In the installed position of the first segment 320 on the hub 302, the fourth portion 334 is adapted to contact and abut the outer surface 306 of the hub 302. The fourth portion 334 defines a length "L2" thereof. The length "L1" of the first top surface 324 is substantially greater than the length "L2". Accordingly, the difference in the length "L1" and the length "L2" defines the wedge-shaped configuration of each of the plurality of first segments 320.

In the illustrated embodiment, an intersection 336 of the third portion 332 and the fourth portion 334 includes a curved configuration defining a radius of curvature "R3" thereof. The radius of curvature "R3" is equal to the radius of curvature "R1" of the intersection 314 of the first side surface 312 and the outer surface 306 of the hub 302. Accordingly, in the installed position of the first segment 320 on the hub 302, the intersection 336 of the third portion 332 and the fourth portion 334 is adapted to contact and abut the intersection 314 of the first side surface 312 and the outer surface 306 of the hub 302. In other embodiments, the intersection 336 of the third portion 332 and the fourth portion 334 may have any other configuration, such as an edged configuration, a chamfered configuration, an inclined configuration, and so on, based on application requirements.

Each of the plurality of first segments 320 also includes a first tooth segment 338. The first tooth segment 338 is provided on the first top surface 324. The first tooth segment 338 and the first top surface 324 is adapted to contact with the track 124 of the machine 100. The first tooth segment 338 includes a first tooth top surface 340. The first tooth top surface 340 extends away from the first outer surface 322 of the first segment 320 and towards the transverse axis Y-Y'. In the illustrated embodiment, the first tooth top surface 340 includes a substantially flat configuration. In other embodiments, the first tooth top surface 340 may include any other configuration, such as a curved configuration, a stepped configuration, a grooved configuration, and so on, based on application requirements. Also, the first tooth top surface 340 is disposed perpendicular with respect to the transverse axis Y-Y'. In other embodiments, the first tooth top surface 340 may be disposed at any angle with respect to the transverse axis Y-Y', based on application requirements.

The first tooth segment 338 also includes a first tooth side surface 342. The first tooth side surface 342 extends away from the first tooth top surface 340 and connects the first top surface 324 of the first segment 320. In the illustrated embodiment, the first tooth side surface 342 includes a substantially flat configuration. In other embodiments, the first tooth side surface 342 may include any other configuration, such as a curved configuration, a stepped configuration, a grooved configuration, and so on, based on application requirements. Also, the first tooth side surface 342 is disposed at an angle "T1" with respect to the transverse axis Y-Y'. In other embodiments, the first tooth side surface 342 may be disposed parallel with respect to the transverse axis Y-Y', based on application requirements.

The assembly 210 further includes a plurality of second segments 344. The plurality of second segments 344 include a configuration similar to the configuration of the plurality of first segments 320. Each of the plurality of second segments 344 is adapted to be removably affixed to the outer surface 306 of the hub 302. Each of the plurality of second segments 344 is disposed adjacent to one another along the outer surface 306 of the hub 302. Each of the plurality of second segments 344 includes a wedge-shaped configuration. In the illustrated embodiment, the plurality of second segments 344 includes nine segments. In other embodiments, the plurality of second segments 344 may include any number of segments, based on application requirements.

Each of the plurality of second segments 344 includes a second outer surface 346. In the illustrated embodiment, the second outer surface 346 includes a substantially flat and stepped configuration. Also, the second outer surface 346 is disposed parallel with respect to the transverse axis Y-Y'. In other embodiments, the second outer surface 346 may include any other configuration, and may be disposed at any angle with respect to the transverse axis Y-Y', based on application requirements. Each of the plurality of second segments 344 also includes a second top surface 348. The second top surface 348 extends away from the second outer surface 346 and towards the transverse axis Y-Y'. In the illustrated embodiment, the second top surface 348 includes a substantially curved configuration. In other embodiments, the second top surface 348 may include any other configuration, such as a flat configuration. The second top surface 348 defines a length "L3" thereof.

Each of the plurality of second segments 344 further includes a second inner surface 350. The second inner surface 350 extends from the second top surface 348 and connects the second outer surface 346. The second inner surface 350 includes a substantially stepped configuration. More specifically, the second inner surface 350 includes a first portion 352, a second portion 354, a third portion 356, and a fourth portion 358. The first portion 352 extends away from the second top surface 348 along the transverse axis Y-Y'. In the illustrated embodiment, the first portion 352 includes a substantially flat configuration. In other embodiments, the first portion 352 may include any other configuration, such as a curved configuration, a stepped configuration, a grooved configuration, and so on, based on application requirements.

Also, the first portion 352 is disposed parallel with respect to the transverse axis Y-Y'. In other embodiments, the first portion 352 may be disposed at any angle with respect to the transverse axis Y-Y', based on application requirements. In an assembled position of the second segment 344 on the hub 302, the first portion 352 is adapted to contact and abut the first portion 328 of the first inner surface 326 of the first segment 320. Also, in the assembled position of the second segment 344 on the hub 302, the second top surface 348 in association with the first top surface 324 of the first segment 320 provides a convex surface 360.

The second portion 354 extends away from the first portion 352 and away from the transverse axis Y-Y'. In the illustrated embodiment, the second portion 354 includes a substantially flat configuration. In other embodiments, the second portion 354 may include any other configuration, such as a curved configuration, a stepped configuration, a grooved configuration, and so on, based on application requirements. Also, the second portion 354 is disposed perpendicular with respect to the transverse axis Y-Y'. In other embodiments, the second portion 354 may be disposed at any angle with respect to the transverse axis Y-Y', based on application requirements. In the installed position of the second segment 344 on the hub 302, the second portion 354 is adapted to contact and abut the top surface 310 of the raised portion 308 of the hub 302.

The third portion 356 extends away from the second portion 354 along the transverse axis Y-Y'. In the illustrated embodiment, the third portion 356 includes a partially flat and partially curved configuration. In other embodiments, the third portion 356 may include any other configuration, such as a fully flat configuration, a fully curved configuration, a stepped configuration, a grooved configuration, and so on, based on application requirements. Also, the third portion 356 is disposed at an angle "S2" with respect to the transverse axis Y-Y'. In other embodiments, the third portion 356 may be disposed parallel with respect to the transverse axis Y-Y', based on application requirements. In the installed position of the second segment 344 on the hub 302, the third portion 356 is adapted to contact and abut the second side surface 316 of the raised portion 308 of the hub 302. Accordingly, the angle "S2" is equal to the angle "F2" of the second side surface 316. In the illustrated embodiment, the third portion 356 connects the second portion 354 in a rounded configuration in order to limit stress concentration therearound. In other embodiments, the third portion 356 may connect the second portion 354 in any other configuration, such as an edged configuration, a chamfered configuration, an inclined configuration, and so on, based on application requirements.

The fourth portion 358 extends away from the third portion 356 and away from the transverse axis Y-Y' and connects the second outer surface 346. In the illustrated embodiment, the fourth portion 358 includes a substantially flat configuration. In other embodiments, the fourth portion 358 may include any other configuration, such as a curved configuration, a stepped configuration, a grooved configuration, and so on, based on application requirements. Also, the fourth portion 358 is disposed perpendicular with respect to the transverse axis Y-Y'. In other embodiments, the fourth portion 358 may be disposed at any angle with respect to the transverse axis Y-Y', based on application requirements. In the installed position of the second segment 344 on the hub 302, the fourth portion 358 is adapted to contact and abut the outer surface 306 of the hub 302. The fourth portion 358 defines a length "L4" thereof. The length "L3" of the second top surface 348 is substantially greater than the length "L4". Accordingly, the difference in the length "L3" and the length "L4" defines the wedge-shaped configuration of each of the plurality of second segments 344.

In the illustrated embodiment, an intersection 362 of the third portion 356 and the fourth portion 358 includes a curved configuration defining a radius of curvature "R4" thereof. The radius of curvature "R4" is equal to the radius of curvature "R2" of the intersection 318 of the second side surface 316 and the outer surface 306 of the hub 302. Accordingly, in the installed position of the second segment 344 on the hub 302, the intersection 362 of the third portion 356 and the fourth portion 358 is adapted to contact and abut the intersection 318 of the second side surface 316 and the outer surface 306 of the hub 302. In other embodiments, the intersection 362 of the third portion 356 and the fourth portion 358 may have any other configuration, such as an edged configuration, a chamfered configuration, an inclined configuration, and so on, based on application requirements.

Each of the plurality of second segments 344 also includes a second tooth segment 364. The second tooth segment 364 is provided on the second top surface 348. The second tooth segment 364 and the second top surface 348 is adapted to contact with the track 124 of the machine 100. The second tooth segment 364 includes a second tooth top surface 366. The second tooth top surface 366 extends away from the second outer surface 346 of the second segment 344 and towards the transverse axis Y-Y'. In the illustrated embodiment, the second tooth top surface 366 includes a substantially flat configuration. In other embodiments, the second tooth top surface 366 may include any other configuration, such as a curved configuration, a stepped configuration, a grooved configuration, and so on, based on application requirements. Also, the second tooth top surface 366 is disposed perpendicular with respect to the transverse axis Y-Y'. In other embodiments, the second tooth top surface 366 may be disposed at any angle with respect to the transverse axis Y-Y', based on application requirements.

The second tooth segment 364 also includes a second tooth side surface 368. The second tooth side surface 368 extends away from the second tooth top surface 366 and connects the second top surface 348 of the second segment 344. In the illustrated embodiment, the second tooth side surface 368 includes a substantially flat configuration. In other embodiments, the second tooth side surface 368 may include any other configuration, such as a curved configuration, a stepped configuration, a grooved configuration, and so on, based on application requirements. Also, the second tooth side surface 368 is disposed at an angle "T2" with respect to the transverse axis Y-Y'. In other embodiments, the second tooth side surface 368 may be disposed parallel with respect to the transverse axis Y-Y', based on application requirements.

Each of the plurality of first segments 320 is removably affixed with respect to the hub 302 using a first set of alignment fasteners 370. Also, each of the plurality of second segments 344 is removably affixed with respect to the hub 302 using a second set of alignment fasteners 372. The alignment fasteners 370, 372 may be any fastening elements known in the art, such as screws, bolts, and so on. In one embodiment, the alignment fasteners 370, 372 may be removed after the assembly 210 may be completed assembled and/or during operation of the assembly 210.

Each of the plurality of first segments 320 is removably affixed with respect to one another using a first set of circumferential fasteners 402. Also, each of the plurality of second segments 344 is removably affixed with respect to one another using a second set of circumferential fasteners (not shown). Also, each of the plurality of first segments 320 is removably affixed with a respective segment of the plurality of second segments 344 and the hub 302 using a first set of axial fasteners 404.

More specifically, each of the first set of axial fasteners 404 is provided through a first bore 374 provided axially through each of the plurality of first segments 320, a second bore 376 provided axially through each of the plurality of second segments 344, and a hub bore 378 provided axially through the raised portion 308 of the hub 302. Additionally, or optionally, each of the plurality of first segments 320 is removably affixed with the respective segment of the plurality of second segments 344 using a second set of axial fasteners 406, a third set of axial fasteners (not shown), and so on, based on application requirements. The fasteners 402, 404, 406 may be any fastening elements known in the art, such as screws, bolts, and so on.

INDUSTRIAL APPLICABILITY

The present disclosure relates to the drive sprocket assembly 210 for the drive assembly 120 of the tracked machine 100. The assembly 210 provides a simple, efficient, and cost-effective segmented design for a sprocket of the drive assembly 120. The assembly 210 provides to limit dissembling of various components of the drive assembly 120 during servicing/repair/replacement of the sprocket.

For example, during replacement of the assembly 210, individual first segments 320 and/or individual second segments 344 may be disassembled from the hub 302 in order to replace them with new first segments 320 and/or new second segments 344 respectively. As such, the disassembly of the complete drive assembly 120 may be limited, in turn, reducing repair time, machine downtime, physical effort, labor cost, and so on.

Also, in some situations, during operation, some segments may be damaged or worn out earlier with respect to other segments of the assembly 210. In such a situation, only the damaged or worn out segments may be replaced, in turn, reducing replacement cost and improving utilization of the remaining segments of the assembly 210. Further, the hub 302 may wear out slower with respect to the plurality of first segments 320 and/or the plurality of second segments 344. As such, the hub 302 may be used multiple times with new set of first segments 320 and/or new set of second segments 344, in turn, reducing replacement cost and improving utilization of the hub 302 of the assembly 210.

Further, the hub 302 is fixedly mounted on the drive shaft 204. As such, movement between the hub 302 and the drive shaft 204 is limited, in turn, limiting wear and tear, noise and friction between the inner surface 304 of the hub 302 and the outer surface 206 of the drive shaft 204. As such, the assembly 210 may provide to increase a working life of the drive shaft 204 and reduce replacement cost thereof. The assembly 210 may be retrofitted on any drive assembly 120 with little or no modification to the existing system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A drive sprocket assembly comprising:
    a hub including:
        an inner surface;
        an outer surface; and
        a raised portion provided centrally along the outer surface, the raised portion including:
            a top surface;
            a first side surface extending between the top surface and the outer surface; and
            a second side surface disposed opposite the first side surface, the second side surface extending between the top surface and the outer surface;
    at least one first segment and at least one second segment, each of the at least one first segment and the at least one second segment adapted to be removably affixed to the hub, each of the at least one first segment and the at least one second segment including:
        a top surface; and
        an inner surface including:
            a first portion extending away from the top surface;
            a second portion extending away from the first portion, the second portion adapted to at least partially abut the top surface of the raised portion;
            a third portion extending away from the second portion, the third portion adapted to at least partially abut the first side surface and the second side surface of the raised portion respectively; and
            a fourth portion extending away from the third portion, the fourth portion adapted to at least partially abut the outer surface; and
    a tooth segment provided on the top surface of each of the at least one first segment and the at least one second segment respectively.

2. The drive sprocket assembly of claim 1, wherein the tooth segment further includes:
a tooth top surface; and
a tooth side surface extending between the tooth top surface and the top surface of each of the at least one first segment and the at least one second segment respectively.

3. The drive sprocket assembly of claim 1, wherein the top surface of each of the at least one first segment and the at least one second segment includes a curved configuration.

4. The drive sprocket assembly of claim 1, wherein the first portion of each of the at least one first segment and the at least one second segment is adapted to abut one another.

5. The drive sprocket assembly of claim 1, wherein:
each of the first side surface of the raised portion and the third portion of the at least one first segment defines a first angle with respect to a transverse axis of the hub, and
each of the second side surface of the raised portion and the third portion of the at least one second segment defines a second angle with respect to the transverse axis of the hub.

6. The drive sprocket assembly of claim 1, wherein each of the at least one first segment and the at least one second segment includes a wedge-shaped configuration such that a length of the top surface thereof is greater than a length of the fourth portion thereof respectively.

7. The drive sprocket assembly of claim 1 further includes:
a plurality of first segments disposed adjacent to one another along the outer surface of the hub; and
a plurality of second segments disposed adjacent to one another along the outer surface of the hub.

8. The drive sprocket assembly of claim 1, wherein each of the at least one first segment and the at least one second segment is removably affixed with respect to one another.

9. A drive sprocket assembly comprising:
at least one first segment and at least one second segment, each of the at least one first segment and the at least one second segment adapted to be removably affixed to a hub of the drive sprocket assembly, each of the at least one first segment and the at least one second segment including:
a top surface; and
an inner surface extending away from the top surface, the inner surface having a stepped configuration, wherein the inner surface is adapted to at least partially abut a raised portion of the hub and an outer surface of the hub, wherein each of the at least one first segment and the at least one second segment includes a wedge-shaped configuration such that a length of the top surface thereof is greater than a length of the inner surface thereof respectively; and
a tooth segment provided on the top surface of each of the at least one first segment and the at least one second segment respectively.

10. The drive sprocket assembly of claim 9, wherein the tooth segment further includes:
a tooth top surface; and
a tooth side surface extending between the tooth top surface and the top surface of each of the at least one first segment and the at least one second segment respectively.

11. The drive sprocket assembly of claim 10, wherein the tooth side surface defines an angle with respect to a transverse axis of the hub.

12. The drive sprocket assembly of claim 9, wherein the top surface of each of the at least one first segment and the at least one second segment includes a curved configuration.

13. The drive sprocket assembly of claim 9, wherein at least a portion of the inner surface of each of the at least one first segment and the at least one second segment defines an angle with respect to a transverse axis of the hub.

14. A drive assembly for an electric rope shovel, the drive assembly comprising:
a housing;
a drive shaft rotatably mounted within the housing; and
a drive sprocket assembly mounted on the drive shaft, the drive sprocket assembly including:
a hub including:
an inner surface adapted to receive the drive shaft therein;
an outer surface; and
a raised portion provided centrally along the outer surface, the raised portion including:
a top surface;
a first side surface extending between the top surface and the outer surface; and
a second side surface disposed opposite the first side surface, the second side surface extending between the top surface and the outer surface;
at least one first segment and at least one second segment, each of the at least one first segment and the at least one second segment adapted to be removably affixed to the hub, each of the at least one first segment and the at least one second segment including:
a top surface; and
an inner surface including:
a first portion extending away from the top surface;
a second portion extending away from the first portion, the second portion adapted to at least partially abut the top surface of the raised portion;
a third portion extending away from the second portion, the third portion adapted to at least partially abut the first side surface and the second side surface of the raised portion respectively; and
a fourth portion extending away from the third portion, the fourth portion adapted to at least partially abut the outer surface; and
a tooth segment provided on the top surface of each of the at least one first segment and the at least one second segment respectively, wherein each of the at least one first segment and the at least one second segment is adapted to receive at least a portion of a track of the electric rope shovel thereon.

15. The drive assembly of claim 14, wherein the top surface of each of the at least one first segment and the at least one second segment includes a curved configuration.

16. The drive assembly of claim 14, wherein the first portion of each of the at least one first segment and the at least one second segment is adapted to abut one another.

17. The drive assembly of claim 14, wherein:
each of the first side surface of the raised portion and the third portion of the at least one first segment defines a first angle with respect to a transverse axis of the hub, and each of the second side surface of the raised portion and the third portion of the at least one second segment defines a second angle with respect to the transverse axis of the hub.

18. The drive assembly of claim 14, wherein each of the at least one first segment and the at least one second segment includes a wedge-shaped configuration such that a length of the top surface thereof is greater than a length of the fourth portion thereof respectively.

19. The drive assembly of claim 14, wherein the drive sprocket assembly further includes:
   a plurality of first segments disposed adjacent to one another along the outer surface of the hub; and
   a plurality of second segments disposed adjacent to one another along the outer surface of the hub.

* * * * *